(12) United States Patent
Hagimoto et al.

(10) Patent No.: US 11,794,838 B2
(45) Date of Patent: Oct. 24, 2023

(54) STRADDLE TYPE VEHICLE

(71) Applicant: HONDA MOTOR CO., LTD., Tokyo (JP)

(72) Inventors: Masashi Hagimoto, Wako (JP); Yoshiyuki Kuroba, Wako (JP); Kiyoshi Katagiri, Wako (JP); Hiroshi Maeda, Wako (JP); Tsuyoshi Kumasaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 565 days.

(21) Appl. No.: 17/013,244

(22) Filed: Sep. 4, 2020

(65) Prior Publication Data

US 2020/0398920 A1     Dec. 24, 2020

Related U.S. Application Data

(63) Continuation of application No. PCT/JP2018/011042, filed on Mar. 20, 2018.

(51) Int. Cl.
| | |
|---|---|
| *B62J 9/10* | (2020.01) |
| *B62J 9/23* | (2020.01) |
| *B62J 45/41* | (2020.01) |
| *B62J 9/30* | (2020.01) |

(Continued)

(52) U.S. Cl.
CPC . *B62J 9/10* (2020.02); *B62J 9/23* (2020.02); *B62J 9/30* (2020.02); *B62J 27/00* (2013.01); *B62J 45/41* (2020.02); *B62J 45/42* (2020.02)

(58) Field of Classification Search
CPC ......... B62J 9/10; B62J 9/23; B62J 9/30; B62J 45/41; B62J 45/42; B62J 27/00
See application file for complete search history.

(56) References Cited

U.S. PATENT DOCUMENTS

| | | | |
|---|---|---|---|
| 4,501,384 A * | 2/1985 | Itoh | ............................ B62J 9/23 224/419 |
| 5,243,417 A | 9/1993 | Pollard | |
| 9,893,415 B2 * | 2/2018 | Hashimoto | .............. B62J 15/00 |

(Continued)

FOREIGN PATENT DOCUMENTS

| | | |
|---|---|---|
| DE | 202005013661 U1 | 5/2006 |
| EP | 1647447 A2 | 4/2006 |

(Continued)

OTHER PUBLICATIONS

International Search Report for PCT/JP2018/011042 dated May 15, 2018.

(Continued)

*Primary Examiner* — Tony H Winner
*Assistant Examiner* — Michael R Stabley
(74) *Attorney, Agent, or Firm* — Thomas | Horstemeyer, LLP (57) ABSTRACT

The present invention provides a straddle type vehicle, comprising: a storage unit arranged at a rear portion of a vehicle to be capable of storing an article; and a detection unit configured to detect a surrounding situation in a rear side of the vehicle, wherein the storage unit includes an outer case and an inner case which defines a storage space capable of storing the article, and wherein the detection unit is arranged between the outer case and the inner case, at a rear portion of the storage unit.

3 Claims, 7 Drawing Sheets

(51) Int. Cl.
  *B62J 45/42* (2020.01)
  *B62J 27/00* (2020.01)

(56) References Cited

U.S. PATENT DOCUMENTS

| | | | |
|---|---|---|---|
| 10,061,992 | B2 | 8/2018 | Gondo |
| 10,801,234 | B2 * | 10/2020 | Takeuchi .................. B62J 9/23 |
| 2016/0013545 | A1 * | 1/2016 | Hashimoto ............ H01Q 1/325 |
| | | | 343/713 |
| 2017/0032195 | A1 | 2/2017 | Gondo |

FOREIGN PATENT DOCUMENTS

| | | | |
|---|---|---|---|
| EP | 2287067 | A2 | 2/2011 |
| FR | 2860486 | A1 | 4/2005 |
| GB | 2388091 | A | 11/2003 |
| GB | 2446845 | A | 8/2008 |
| JP | S59-193786 | U | 12/1984 |
| JP | 61162777 | A * | 7/1986 |
| JP | S61-162777 | A | 7/1986 |
| JP | 2001-105973 | A | 4/2001 |
| JP | 2001151015 | A | 6/2001 |
| JP | 2013-060128 | A | 4/2013 |
| JP | 2017030530 | A | 2/2017 |
| JP | 2017132278 | A | 8/2017 |
| JP | 2017171223 | A | 9/2017 |
| WO | 2018042575 | A1 | 3/2018 |
| WO | 2019180816 | A1 | 9/2019 |

OTHER PUBLICATIONS

IPRP for PCT/JP2018/011042 dated Dec. 11, 2019.
German Office Action for German Patent Application No. 112018007317.3 dated Jul. 12, 2022 (partially translated).
Japanese Office Action for Japanese Patent Application No. 2020-507165 dated Oct. 29, 2021 (partially translated).

* cited by examiner

STRADDLE TYPE VEHICLE

CROSS-REFERENCE TO RELATED APPLICATION(S)

This application is a continuation of International Patent Application No. PCT/JP2018/011042 filed on Mar. 20, 2018, the entire disclosures of which is incorporated herein by reference.

BACKGROUND OF THE INVENTION

Field of the Invention

The present invention relates to a straddle type vehicle and, more particularly, to a straddle type vehicle including a detection unit configured to detect a surrounding situation of the rear side of the vehicle.

Background Art

In recent years, from the viewpoint of safety, a detection device configured to detect the surrounding situation of a vehicle has been mounted in a straddle type vehicle (for example, a two-wheeled vehicle). Japanese Patent Laid-Open No. 2017-171223 discloses an arrangement in which a detection device configured to detect the surrounding situation of the front side of a vehicle is mounted below the headlight of a two-wheeled vehicle.

In order to further improve the safety, in a straddle type vehicle, detection of the surrounding situation of the rear side of the vehicle in addition to the front side of the vehicle is requested. It is desirable to mount a detection device configured to detect the surrounding situation of the rear side of the vehicle at an appropriate position where a detection error can be reduced.

SUMMARY OF THE INVENTION

The object of the present invention is reducing a detection error in a detection device configured to detect the surrounding environment of the rear side of a vehicle.

According to one aspect of the present invention, there is provided a straddle type vehicle, comprising: a storage unit arranged at a rear portion of a vehicle to be capable of storing an article; and a detection unit configured to detect a surrounding situation in a rear side of the vehicle, wherein the storage unit includes an outer case and an inner case which defines a storage space capable of storing the article, and wherein the detection unit is arranged between the outer case and the inner case, at a rear portion of the storage unit.

Further features of the present invention will become apparent from the following description of exemplary embodiments with reference to the attached drawings.

DESCRIPTION OF EMBODIMENTS

The embodiment of the present invention will now be described with reference to the accompanying drawings. The present invention is not limited to the following embodiments, and includes changes and modifications of arrangements within the scope of the present invention. In addition, not all the combinations of features described in the embodiments are necessarily essential to the present invention.

A straddle type vehicle according to an embodiment of the present invention will be described with reference to the accompanying drawings. In this embodiment, a motorcycle exemplified as the straddle type vehicle will be described below. In the drawings, an arrow FR indicates the front-and-rear direction of the vehicle; FT, the front side; and RR, the rear side. An arrow W indicates the vehicle width direction; LT, the left side; and RT, the right side when viewed from the front-and-rear-direction. An arrow H indicates the vertical direction; UR, the upper side; and LR, the lower side. Note that the present invention is not limited to the following embodiment but include changes and modifications of the arrangements within the spirit and scope of the present invention. In addition, all the combinations of the features described in the following embodiment are not dispensable to the present invention.

Figure 1:
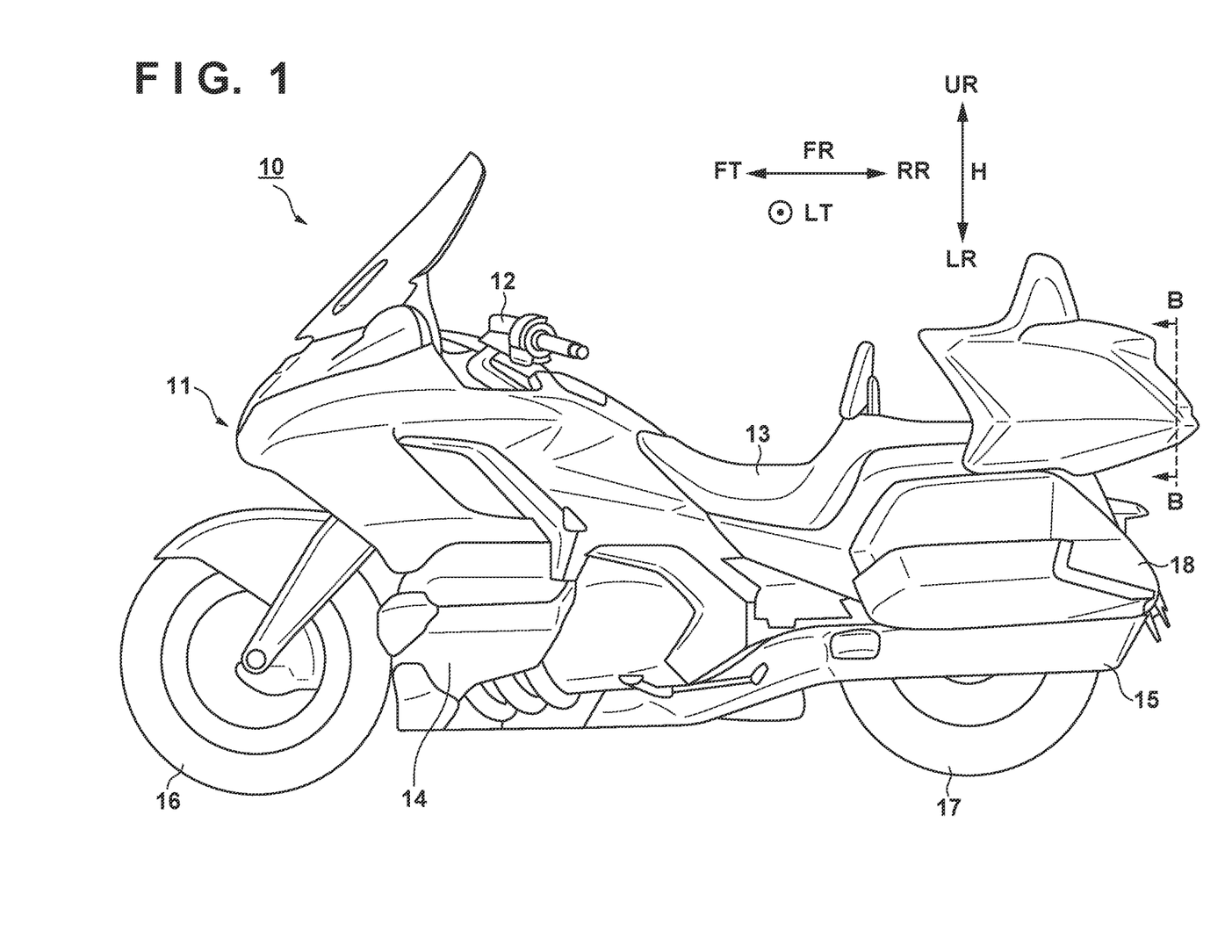
FIG. 1 is a view when a straddle type vehicle is viewed from the left side.
Figure 2:
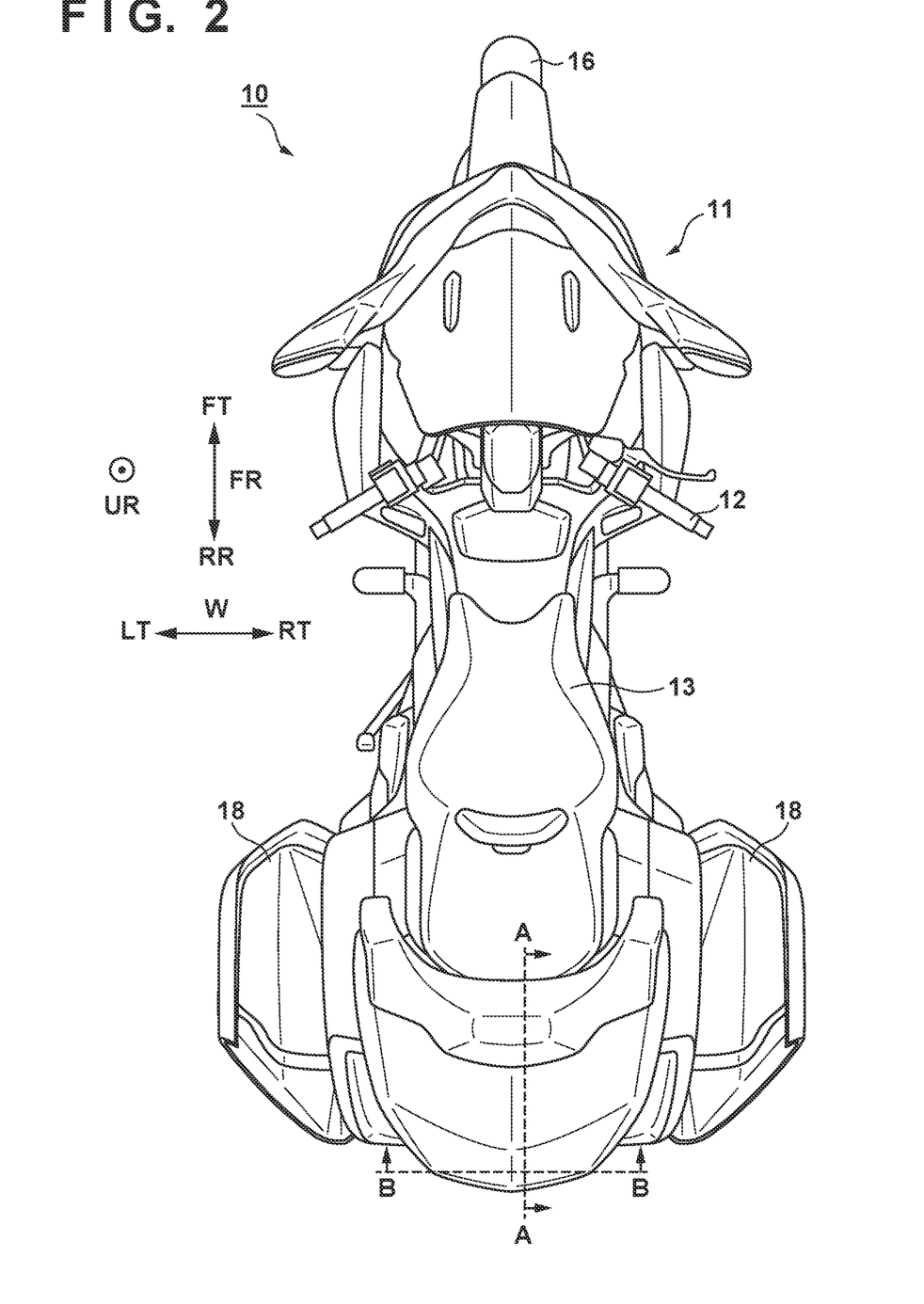
FIG. 2 is a view when the straddle type vehicle is viewed from the above.
Figure 3:
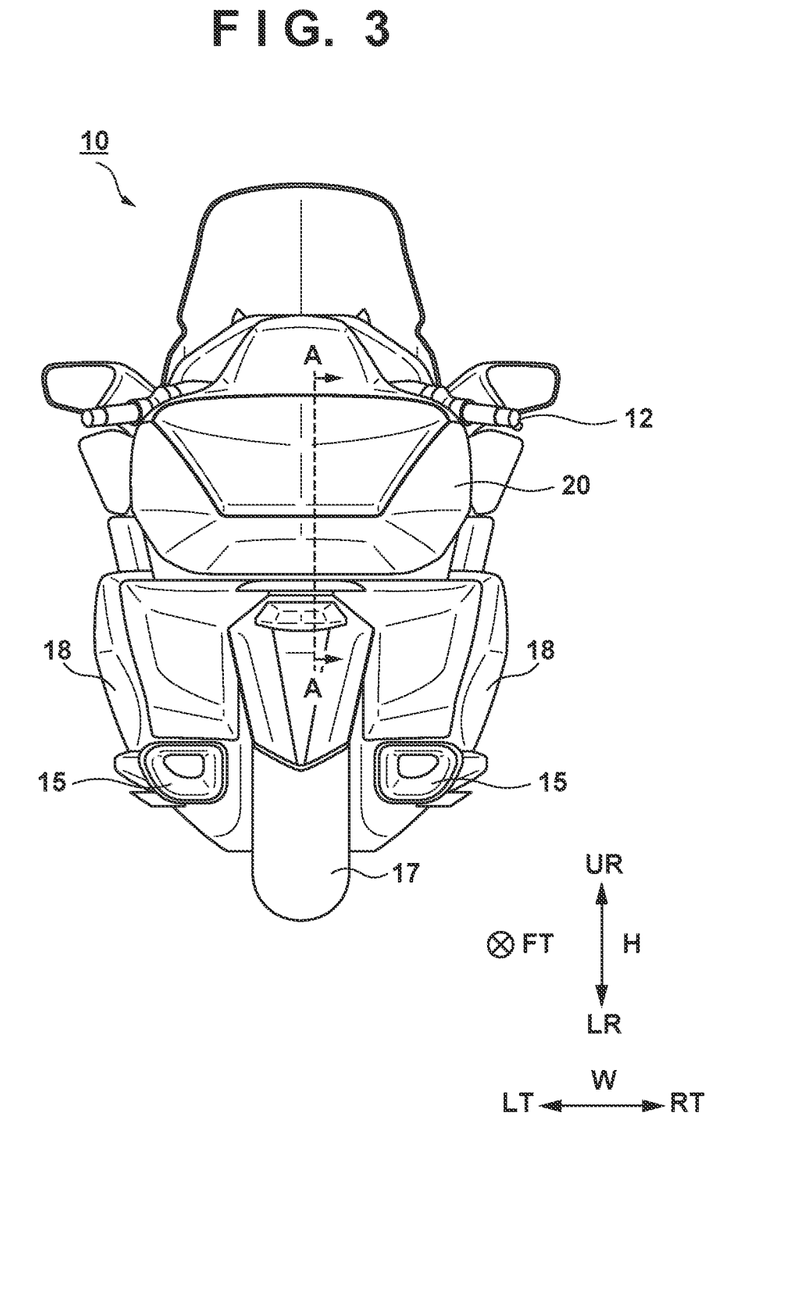
FIG. 3 is a view when the straddle type vehicle is viewed from the rear side.

FIGS. 1 to 3 are views showing a straddle type vehicle 10 according to this embodiment. FIG. 1 is a view when the straddle type vehicle 10 is viewed from the left side, FIG. 2 is a view when the straddle type vehicle 10 is viewed from the above, and FIG. 3 is a view when the straddle type vehicle 10 is viewed from the rear side. The straddle type vehicle 10 shown in FIGS. 1 to 3 can include a vehicle body cover 11, a steering handle 12, an occupant seat 13, a power unit 14, mufflers 15, a front wheel 16, a rear wheel 17, side boxes 18, and a rear-top box 20.

The vehicle body cover 11 is formed to cover the vehicle body frame and the vehicle body. The steering handle 12 is pivotally supported by the head pipe of the vehicle body frame and is arranged to allow steering of the front wheel 16. The occupant seat 13 is arranged on the rear side of the steering handle 12 and allows two occupants to sit side by side in the front-and-rear direction of the vehicle in this embodiment. The power unit 14 includes an engine and a transmission for shifting gears using the output from the engine. The output from the transmission is transmitted to the rear wheel 17 by propeller shaft driving. The combustion gas exhausted from the exhaustion portion of the engine is exhausted from the mufflers 15. The side boxes 18 can be formed to store articles and arranged on the left and right sides of the vehicle. The rear-top box 20 (the storage unit) can be formed to store articles and arranged on the upper portion of the rear end of the vehicle body.

In recent years, from the viewpoint of safety, a detection unit 30 configured to detect the surrounding situation of the straddle type vehicle 10 is mounted in the straddle type vehicle 10. A control unit (not shown) such as an ECU is required to output (informs) information using display or a voice in accordance with the surrounding situation detected by the detection unit 30 to get the driver's attention and assist the steering operation. A millimeter-wave radar, a laser radar, or a camera can be used as the detection unit 30. This embodiment will exemplify the use of the millimeter-wave radar as the detection unit 30.

This detection unit 30 can be arranged at the front end of the vehicle 10 to detect the surrounding situation of the front side of the vehicle. However, to further improve the safety, it is desirable to arrange the detection unit 30 also on the rear end of the vehicle 10. On the other hand, if an object except the detection target, which hardly transmits the radio wave (millimeter-wave), such as a metal member exists within the radio wave emission range in the detection unit 30 (for example, the millimeter-wave radar), a detection error tends to occur due to the influence of the object. For this reason, the detection unit 30 is preferably arranged such that another member of the vehicle 10 which does not transmit the radio wave does not exist on the farther rear side (the radio wave emission direction side) than an exit surface 31 of the radio wave. In addition, since a detection error tends to occur when the detection unit 30 is arranged near the road (the road surface), the detection unit 30 is preferably arranged at a position spaced apart from the road (the road surface) as much as possible.

In the straddle type vehicle 10 of this embodiment, the detection unit 30 configured to detect the surrounding situation of the rear side of the vehicle is arranged at the rear end of the rear-top box 20. Since another member of the vehicle 10 does not exist near the rear end of the rear-top box 20, as shown in FIG. 1, the detection unit 30 is arranged at the rear end of the rear-top box 20 so another member of the vehicle 10 which hardly transmits the radio wave is not arranged in the radio wave emission direction (that is, the farther rear side of the vehicle than the exit surface 31 of the radio wave). For this reason, a detection error caused by the other member can be prevented. In addition, since the rear-top box 20 is arranged above the rear end of the vehicle body, the detection unit 30 can be arranged to be spaced apart from the road (the road surface), and the detection error caused by the influence of the road can be reduced (prevented).

Figure 4:
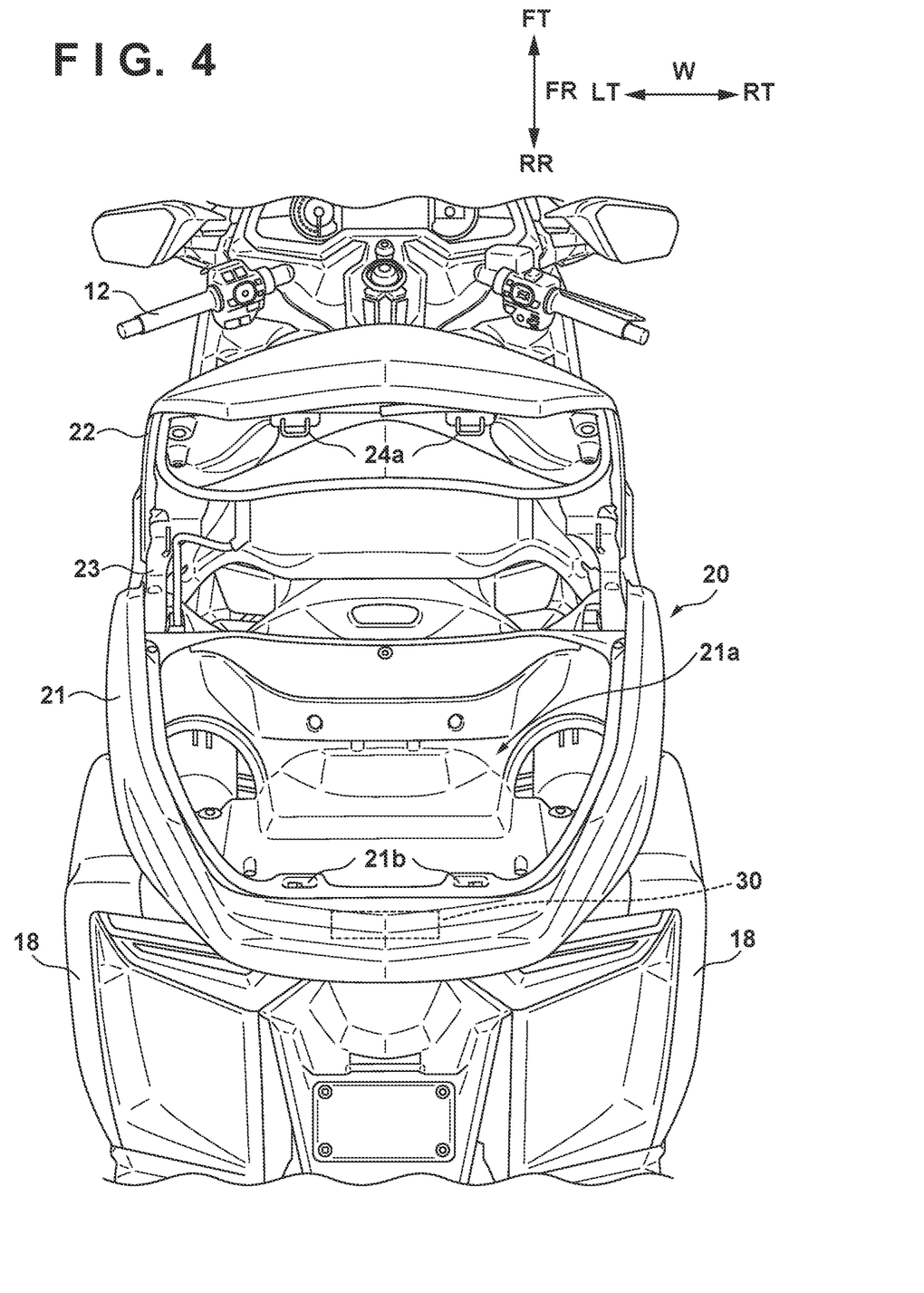
FIG. 4 is a view when the rear portion of the straddle type vehicle is viewed from obliquely above.
Figure 5:
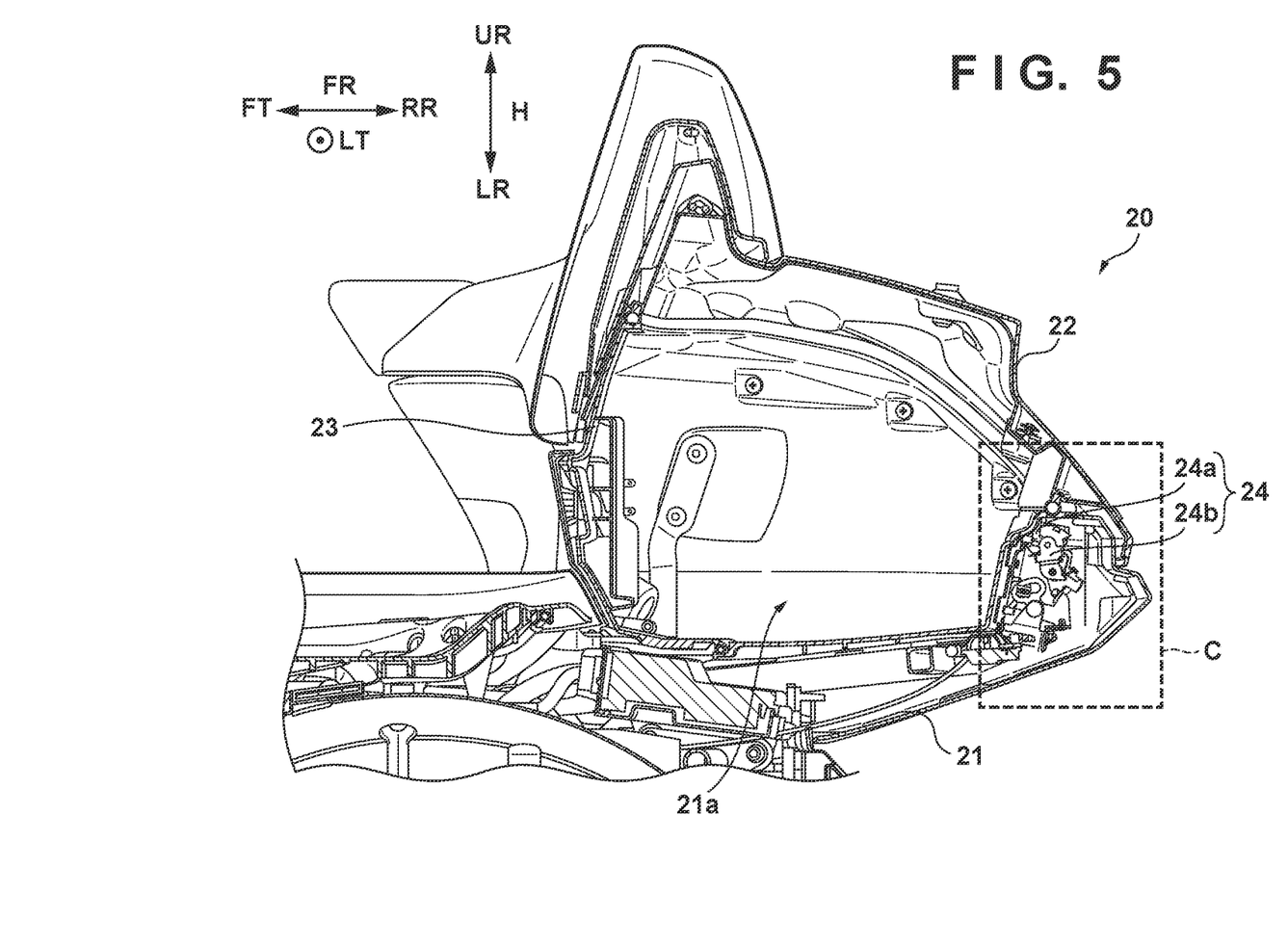
FIG. 5 is a sectional view of a rear-top box in a state in which a lid portion is kept closed.
Figure 6:
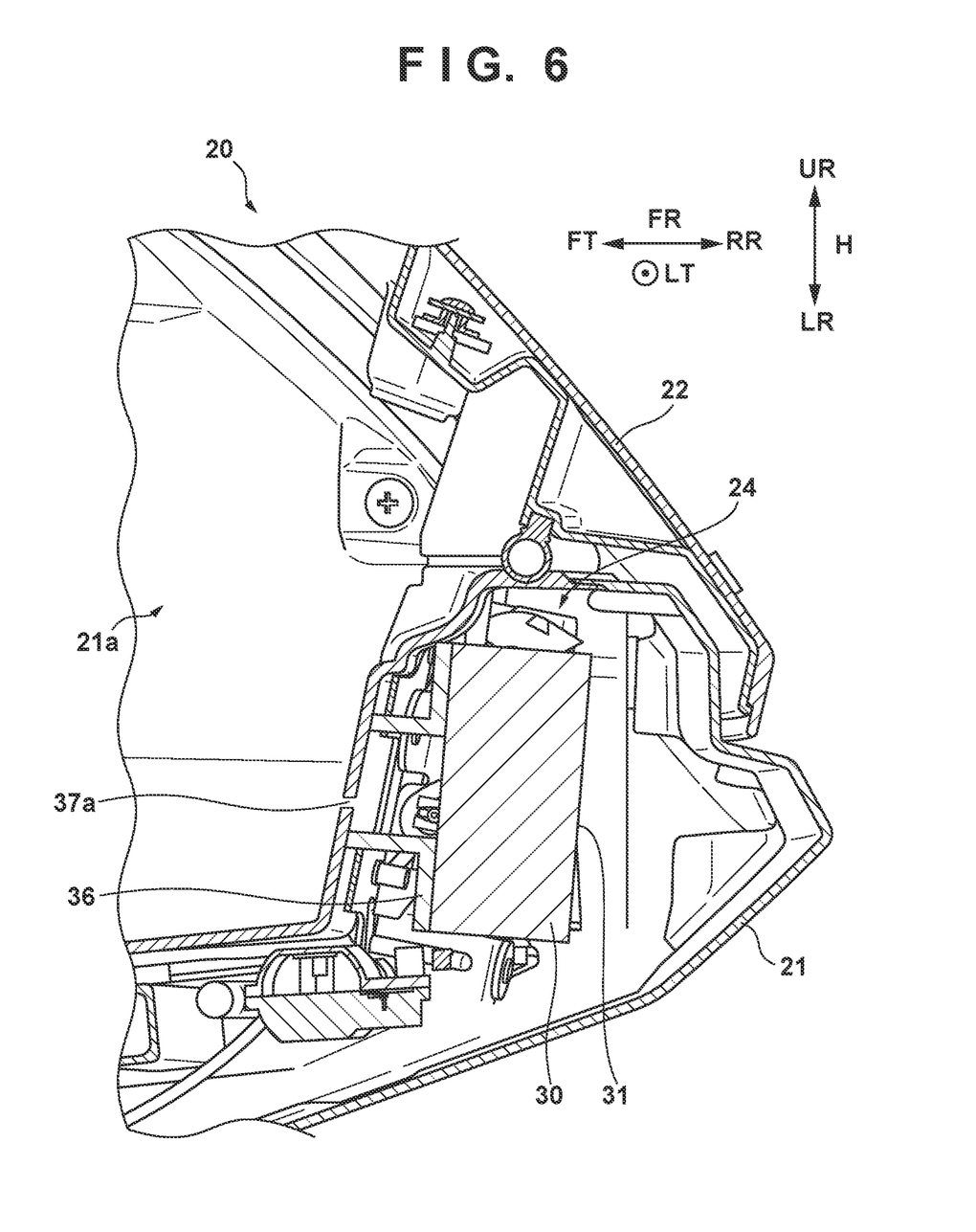
FIG. 6 is an enlarged sectional view of the rear end of the rear-top box.

An example of the detailed layout of the detection unit 30 will be described with reference to FIGS. 4 to 7. FIG. 4 is a view when the straddle type vehicle 10 is viewed from obliquely above and shows the rear-top box 20 in a state in which a lid portion 22 is kept open. FIG. 5 is a sectional view (the sectional view along a line A-A in each of FIGS. 2 and 3) of the rear-top box 20 in a state in which the lid portion 22 is kept closed. FIG. 6 is an enlarged sectional view of the rear end (a region C in FIG. 5) of the rear-top box 20. In FIG. 5, the illustration of the detection unit 30 is omitted so as to easily observer locking mechanisms 24 (to be described later). However, the detection unit 30 is illustrated in FIG. 6. In addition, FIG. 7 is a sectional view (the sectional view along a line B-B in each of FIGS. 1 and 2) of the rear-top box 20 in a state in which the lid portion 22 is kept closed.

As shown in FIGS. 4 and 5 and the like, the rear-top box 20 includes a base portion 21 defining a storage space 21a in which an article is stored, and the lid portion 22 functioning as the lid which covers the storage space 21a of the base portion 21. In addition, the rear-top box 20 also includes pivotal support portions 23 to pivotally support the lid portion 22 so as to allow pivotal motion with respect to the base portion, so that the lid portion 22 can be opened/closed from the rear end side of the rear-top box 20. The base portion 21 and the lid portion 22 can be made of a material which easily transmits the radio wave emitted from the millimeter-wave radar. An example of the material is a resin material or a plastic material.

The rear-top box 20 also includes the locking mechanisms 24 for locking (fixing) the base portion 21 and the lid portion 22 by the rear end side when the lid portion 22 is closed. As shown in FIGS. 4 and 7, each locking mechanism 24 includes, for example, a rectangular ring member 24a mounted on the lid portion 22 and a hook member 24b arranged on the base portion 21. When the lid portion 22 is closed to insert the ring members 24a into openings 21b of the base portion 21, the hook members 24b are caught by the ring members 24a to fix the base portion 21 and the lid portion 22, as shown in FIGS. 5 and 7. Each locking mechanism 24 is made of a material such as a metal member which hardly transmits the radio wave emitted from the millimeter-wave radar. The locking mechanisms 24 are arranged at a plurality of locations (for example, two locations) spaced apart from each other in the vehicle width direction, as shown in FIGS. 4 and 7.

Figure 7:
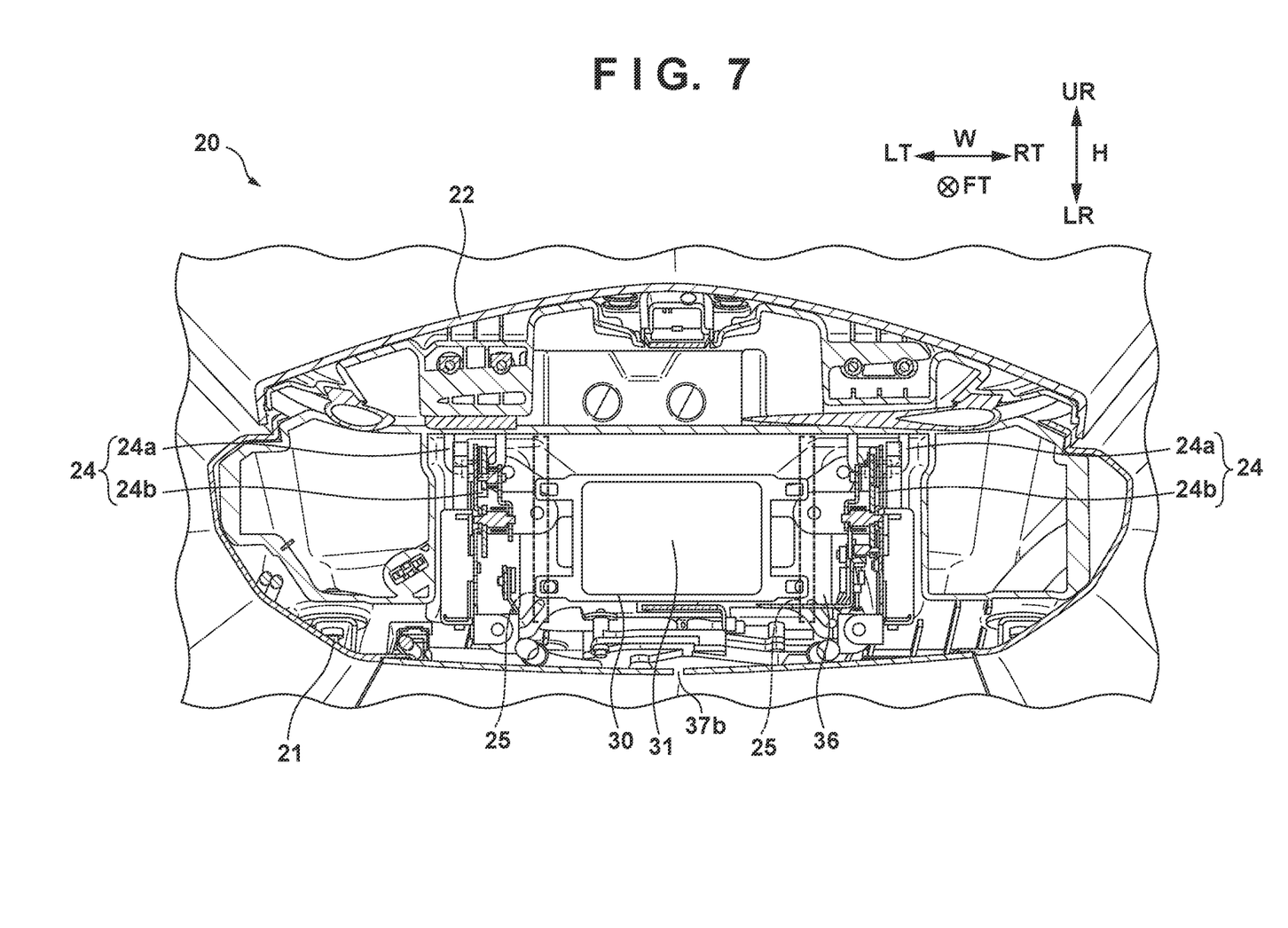
FIG. 7 is a sectional view of the rear-top box in a state in which the lid portion is kept closed.

As shown in FIGS. 6 and 7, the detection unit 30 is arranged inside the base portion 21 at the rear end of the rear-top box 20. As described above, since the base portion 21 of the rear-top box 20 is made of the material which easily transmits the radio wave from the detection unit 30 (the millimeter-wave radar), a detection error by the influence of the base portion 21 occurs at a low possibility even if the detection unit 30 is arranged inside the base portion 21. By arranging the detection unit 30 inside the base portion 21, the direct influence of water such as rain from the outside of the rear-top box 20 can be reduced. In order to further reduce the influence of water entering from the openings 21b of the base portion 21, a wall portion 25 may be formed between the openings 21b and the detection unit 30, as shown in FIG. 7.

In addition, the detection unit 30 can be arranged between the plurality (two) of locking mechanisms 24 and fixed to support members 36 which support the locking mechanisms 24 in the vehicle width direction, as shown in FIG. 7. Each support member 36 is formed by, for example, a metal plate. When a vibration is transmitted from the support members 36, the detection error of the detection unit 30 tends to occur by this vibration. For this reason, the detection unit 30 may be fixed to the support members 36 via vibration damping members. The vibration damping members can be members capable of reducing the vibrations transmitted from the support members 36 to the detection unit 30, and, for example, rubber mounts may be used as the support members 36. In this embodiment, an arrangement in which one detection unit 30 is arranged between the two locking mechanisms 24 has been described above. However, the present invention is not limited to this. The plurality of detection units 30 may be arranged to detect the surrounding situation of the obliquely rear side of the vehicle 10. In this case, for example, the detection unit 30 can be arranged on at least one of the left side and the right side of the two locking mechanisms 24.

Furthermore, as described above, since a detection error tends to occur when a member (for example, a metal member) which hardly transmits the radio wave exists on the farther rear side than the exit surface 31 of the radio wave, the detection unit 30 is arranged so that the rear end (the exit surface 31) of the detection unit 30 is arranged on the farther rear side of the vehicle than the rear end of each locking mechanism 24, as shown in FIG. 6. More specifically, the detection unit 30 is arranged so that the exit surface 31 is located on the farther rear side than the rear end of each locking mechanism 24 formed by the metal member.

A heat dissipation hole 37 for dissipating heat generated by the detection unit 30 may be formed in the rear-top box 20 (the base portion 21). For example, the hole 37 may be formed in the side wall of the storage space 21a (a hole 37a in FIG. 6) so that the internal space in which the detection unit 30 in the base portion 21 communicates with the storage space 21a. Accordingly, heat generated by the detection unit 30 can be dissipated to the storage space 21a. In addition, the hole 37 may be formed in the lower wall of the rear-top box (a hole 37b in FIG. 7) so that the internal space in which the detection unit 30 is arranged in the base portion 21 communicates with the external space of the rear-top box 20. Accordingly, the heat generated by the detection unit 30 can be dissipated to the external space while the influence of rain or the like can be avoided.

As described above, in the straddle type vehicle 10 of this embodiment, the detection unit 30 configured to detect the surrounding situation of the rear side of the vehicle is arranged at the rear end of the rear-top box 20 (the storage unit). Accordingly, a detection error of the detection unit 30 can occur at a low possibility, and the safety can be improved. In addition, since the detection unit is arranged in the rear-top box 20 serving as an optional part, selectivity of the optional part obtained by integrating the detection unit 30 with the rear-top box can be widened.

SUMMARY OF EMBODIMENTS

1. A straddle type vehicle of the above described embodiment includes
    a storage unit (20) arranged at a rear portion of a vehicle (10) to be capable of storing an article, and
    a detection unit (30) configured to detect a surrounding situation in a rear side of the vehicle,
    wherein the detection unit is arranged at a rear end of the storage unit.

According to this embodiment, since the detection unit is arranged at the rear end of the storage unit, a detection error caused by the existence of an object except a detection target in a radio wave emission range and a detection error caused by the influence of a road (road surface can be reduced. The detection performance can be ensured, and detection of a wide-angle region can be performed. In addition, the influence of vibrations can also be reduced.

2. In the above described embodiment,
    the storage unit includes a base portion (21) defining a storage space (21a) capable of storing the article and a lid portion (22) pivotally supported with respect to the base portion and functioning as a lid of the storage space, and
    the detection unit is arranged in the base portion.

According to this embodiment, since the detection unit is arranged in the base portion of the storage unit, a detection error caused by the influence from another member of the vehicle and a road can be reduced, and the influence of vibrations can also be reduced. In addition, since the detection unit is arranged in the base portion of the storage unit, the layout of a transmission wiring can be facilitated as compared with the case in which the detection unit is arranged in the lid portion of the storage unit.

3. In the above described embodiment,
    the storage unit includes a locking mechanism (24) configured to lock the lid portion to the base portion, and
    the detection unit is arranged so that a rear end of the detection unit is located on a farther rear side of the vehicle than a rear end of the locking mechanism.

According to this embodiment, since the detection unit is arranged so that the rear end of the detection unit is arranged on the farther rear side of the vehicle than the rear end of the locking mechanism of the storage unit, a detection error of the detection unit caused by the influence of the locking mechanism can be reduced.

4. In the above described embodiment,
    the storage unit includes a plurality of locking mechanisms arranged to be spaced apart from each other in a vehicle width direction, and
    the detection unit is arranged between the plurality of locking mechanisms in the vehicle width direction.

According to this embodiment, since the detection unit is arranged between the plurality of locking mechanisms arranged in the storage unit in the vehicle width direction, a detection error of the detection unit caused by the influence of another vehicle member such as the locking mechanism can be reduced.

5. In the above described embodiment,
    the detection unit is fixed to a support member (36) that supports the locking mechanism.

According to this embodiment, since the detection unit is fixed to the support member that supports the locking mechanism, the mounting rigidity of the detection unit to the vehicle can be increased, and at the same time the variation of the detection angle of the detection unit due to the vibrations can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A straddled vehicle, comprising:
    a storage unit arranged at a rear portion of a vehicle to be capable of storing an article; and
    a detection unit configured to detect a surrounding situation in a rear side of the vehicle,
    wherein the storage unit includes an outer case which can transmit a signal to be detected by the detection unit, and an inner case which defines a storage space capable of storing the article,
    wherein the storage unit includes a base portion defining the storage space, a lid portion pivotally supported with respect to the base portion and functioning as a lid of the storage space, and a locking mechanism configured to lock the lid portion to the base portion, and
    wherein the detection unit is arranged between the outer case and the inner case of the base portion, at a rear portion of the storage unit, and is fixed to a support member that supports the locking mechanism.

2. The straddled vehicle according to claim 1, wherein
    the detection unit is arranged so that a rear end of the detection unit is located on a farther rear side of the vehicle than a rear end of the locking mechanism.

3. The straddled vehicle according to claim 1, wherein
    the storage unit includes a plurality of locking mechanisms arranged to be spaced apart from each other in a vehicle width direction, and
    the detection unit is arranged between the plurality of locking mechanisms in the vehicle width direction.

* * * * *